United States Patent [19]

Pakus

[11] Patent Number: 4,654,977
[45] Date of Patent: Apr. 7, 1987

[54] ELECTRONIC LEVEL
[75] Inventor: Edward Pakus, East Northport, N.Y.
[73] Assignee: Irwin Measuring Tool Company, Patchogue, N.Y.
[21] Appl. No.: 799,406
[22] Filed: Nov. 19, 1985
[51] Int. Cl.$^4$ ............................................. G01C 9/06
[52] U.S. Cl. ........................................ 33/366; 33/379
[58] Field of Search ...................... 33/366, 348, 379; 200/184, 61.45 R

[56] References Cited
U.S. PATENT DOCUMENTS

| | | | |
|---|---|---|---|
| 3,786,472 | 1/1974 | Scopacasa | 33/366 |
| 4,079,521 | 3/1978 | Uhorczak | 33/366 |
| 4,121,347 | 10/1978 | Thele | 33/366 |
| 4,152,839 | 5/1979 | McDonald | 33/366 |
| 4,506,450 | 3/1985 | Fleming et al. | 33/366 |

Primary Examiner—Willis Little
Attorney, Agent, or Firm—Curtis, Morris & Safford

[57] ABSTRACT

An electronic level having a horizontal and/or a vertical transducer, each of which exhibits an effective impedance that is a function of the deviation of that transducer from a reference plane. Preferably, each transducer is an electrolytic transducer formed of a container partially filled with electrolytic liquid. Depending upon the general horizontal or vertical orientation of the level, one or the other transducer is connected to a drive signal generating circuit which supplies an output drive signal of a magnitude that is a function of the impedance of that transducer. This output drive signal is applied to a display driver which, in turn, drives an array of visual indicators in accordance with the output signal magnitude.

36 Claims, 6 Drawing Figures

ELECTRONIC LEVEL

BACKGROUND OF THE INVENTION

This invention relates to an electronic level and, more particularly, to such a level which provides a more sensitive and, thus, more accurate, representation of the orientation thereof relative to a reference plane. Preferably, the electronic level provides a representation of the relative horizontal orientation thereof and also a representation of the relative vertical orientation thereof.

Levels have long been used to provide craftsmen and artisans with indications of the relative alignment of a workpiece with respect to a horizontal or vertical plane. Such levels are used widely in the fields of construction, carpentry, etc. in which a workpiece, beam, plane, etc. must be aligned with the horizontal or vertical.

Typically, levels have been formed generally as elongated members having two (or more) containers partially filled with liquid so as to form a permanent bubble in each container. One container is predisposed such that the bubble, although free to move from end thereof to the other, nevertheless is centrally located within the container when the level (and, thus, the liquid within this container) exhibits proper horizontal alignment. Similarly, the other container is predisposed such that, when the level is used to indicate vertical alignment, the bubble in this container likewise is positioned in the center of the container. Suitable reference marks normally are provided on the respective containers such that the user can ascertain easily when the respective bubbles are centrally positioned.

While such mechanical levels have been used successfully for several years, it had been thought that more accurate indications and more easily observable displays could be derived by adapting electronic circuitry to such instruments. One example of an electronic level is described in U.S. Pat. No. 4,079,521, in which two capsules containing mercury globules are used to indicate the relative deviation of the level from, for example, the horizontal plane. The housing in which these mercury switches are contained may be rotated when the level is used to indicate vertical alignment. One drawback of the electronic level described in this patent is that the mercury switches provide only a small number (e.g. three) of indications of alignment. This is due to the fact that the mercury-filled capsules function as simple on/off switches and do not permit a more continuous spectrum of alignment indications. That is, the mercury-filled capsules function as discrete sensors which may indicate, for example, "up", "down" or "level" alignments.

A modification of the electronic level described in the aforementioned patent is set out in U.S. Pat. No. 4,152,839. Here, a mercury globule slides in a capsule between two opposite end electrodes, the mercury completing a circuit to one or the other of these electrodes when the level is tilted upward or downward, respectively. Corresponding indications are provided as a display of the orientation of the level. When the level is horizontal, the mercury globule completes a circuit to a center electrode, resulting in a corresponding visual display. In this patent, two separate capsules are provided, one for sensing and indicating horizontal alignment of the level and the other for sensing and indicating vertical alignment thereof. Here too, however, only discrete indications are sensed and displayed: up, down or level. The user is not apprised of an approaching level condition and, thus, he may find it time-consuming and even difficult to detect proper horizontal (or vertical) orientation.

U.S. Pat. No. 2,910,782 relies upon a pool of mercury which extends across a number of contacts depending upon the horizontal orientation, or tilt, of its container. Thus, depending upon the degree of tilt, a corresponding number of contacts engage the mercury, resulting in the lighting of one or more lamps. A similar level-indicating device is described in U.S. Pat. No. 1,375,278.

Various other leveling instruments have been suggested in the past, such as those which rely upon reflection and refraction of light beams as a representation of the horizontal (or vertical) orientation of the device.

A common deficiency found in the electronic level instruments described in the aforementioned patents is the sensing thereof of discrete orientations of the level itself. That is, an upward or downward tilting is sensed by the particular electrical contacts, or electrodes, which are engaged by a moving globule of mercury. This results in a somewhat less than accurate instrument. The orientation of the level between, for example, two discrete positions cannot be sensed.

Another disadvantage associated with the aforementioned electronic levels is the requirement for the user to operate a manual switch when the level is changed from a generally horizontal orientation to a vertical orientation. If the switch is not suitably operated, for example, if the user forgets to actuate it, the level will not operate in its new orientation.

Yet another disadvantage of these devices is the omission therein of a power conservation device. As a result, if the level is not used, the failure to open the power switch will result in a rapid drain of the batteries used therewith.

OBJECTS OF THE INVENTION

Therefore, it is an object of the present invention to provide an improved electronic level which overcomes each of the aforenoted disadvantages.

Yet another object of this invention is to provide an electronic level in which a signal varies continuously to indicate the precise orientation of the level.

A further object of this invention is to provide an electronic level in which a continuous orientation of the level is detected, rather than discrete orientations thereof.

An additional object of this invention is to provide an electronic level which automatically changes over its operation from horizontal detection to vertical detection.

Yet another object of this invention is to provide an electronic level in which battery drain is avoided when the device is not in use notwithstanding the fact that its power switch might not be opened.

It is a still further object of this invention to provide an electronic level that is easy, reliable and accurate to use, is self-contained, provides an electronic display of the relative horizontal or vertical orientation thereof and generates a signal which varies continuously as the orientation of the instrument varies.

Another object of this invention is to provide an electronic level which utilizes electrolytic transducers to sense the horizontal and vertical orientation thereof, such transducers being formed as, for example, containers that are partially filled with electolyte and which exhibit continuously varying impedances as the orientations thereof vary.

Various other objects, advantages and features of the present invention will become readily apparent from the ensuing detailed description, and the novel features will be particularly pointed out in the appended claims.

SUMMARY OF THE INVENTION

In accordance with this invention, an electronic level comprises an electrolytic transducer preferably including a container partially filled with electrolyte that exhibits an effective impedance which varies with a change in the orientation of the transducer relative to a reference plane. The electrolytic transducer is coupled to a circuit that is energized by, for example, a battery; and the circuit produces an output signal having a magnitude determined by the effective impedance of the transducer. This output signal is supplied to a display driver which, in turn, selectively drives an array of visual indicators as a function of the magnitude of that output signal, whereby a visual indication of the deviation of the level with respect to a reference orientation is displayed.

Preferably, the transducer, the visual indicators, the display driver and the battery are included in a housing formed in or with the level.

In one embodiment of the invention, the transducer is coupled to the output of a current regulator circuit and is supplied with a substantially constant current notwithstanding long-term depletions of the battery. The transducer operates as a current divider whose dividing ratio is determined by its changing impedance. As the level of the electrolyte changes in its container, the effective impedance thereof changes in a corresponding manner. In one embodiment, the transducer is provided with an input terminal to which the regulated current is applied, an output terminal coupled to the display driver and a common terminal connected to a reference potential. The current dividing ratio from the input terminal to the output and common terminals varies with the level of the electrolyte.

Preferably, the electronic level is provided with two electrolytic transducers: one for use when the level measures horizontal deviations and the other for use when the level measures vertical deviations. Both transducers may be of substantially similar construction and disposed at right angles to each other. In the aforementioned embodiment, an output signal is derived from one transducer when the deviation of the level from the horizontal plane is less than its deviation from the vertical plane, and the output signal is derived from the other transducer when the deviation of the level from the vertical plane is less than its deviation from the horizontal plane. By producing only one output signal at a time, the very same display and display driver may be used to indicate horizontal and vertical orientations, respectively.

In another embodiment of the invention, two transducers are connected to the input of the circuit that is energized by the battery, for example, a regulating circuit, which in turn provides an output signal that varies as the impedance of one or the other transducer varies.

When two transducers are used to measure horizontal and vertical orientations, respectively, switches that close mutually exclusively of each other connect one or the other transducer to the input or to the output of the circuit. For example, a horizontal switch may close to connect the horizontal transducer to the circuit and the vertical switch may close to connect the vertical transducer to that circuit. The particular switch which closes is a function of whether the level is oriented closer to the horizontal or vertical plane. The switches may be gravity-sensitive switches and, in one embodiment, these switches are constructed as mercury switches. When formed as such mercury switches, two sets of switch contacts are provided, one set being disposed in approximately horizontal orientation and the other set being disposed in approximately vertical orientation. With this construction, both sets of switch contacts are opened when the level is disposed in a non-operating orientation, thereby disconnecting both transducers from the circuit. Advantageously, this automatic disconnection minimizes battery drain when the level is not in use.

As another aspect of this invention, the array of visual indicators preferably is comprised of LED's. For ease of observation and to simplify the use of the electronic level, LED's of different colors may be provided to indicate different orientations of the level. For example, significant deviations from the reference (i.e. horizontal or vertical) plane may be indicated by the energization of a red LED. As the deviation of the level from the reference plane is reduced, that is, as the level is oriented closer to the reference plane, a yellow LED may be energized. Finally, a green LED may be used to indicate when the level is properly aligned with the reference plane. Alternatively, other visual indicators, such as LCD's, may be used. Still further, although the preferred embodiment energizes a selected one of the array of indicators, a number of such indicators may be energized concurrently to provide a "line" of light representative of the deviation of the level from the reference plane.

It will be appreciated that, by reason of the present invention, a more accurate measurement of the relative orientation of the level may be obtained, resulting in a more accurate display thereof.

BRIEF DESCRIPTION OF THE DRAWINGS

The following detailed description, given by way of example, and not intended to limit the present invention solely to the illustrated embodiments, will best be understood in conjunction with the accompanying drawings in which.

DETAILED DESCRIPTION OF CERTAIN PREFERRED EMBODIMENTS

Figure 1:
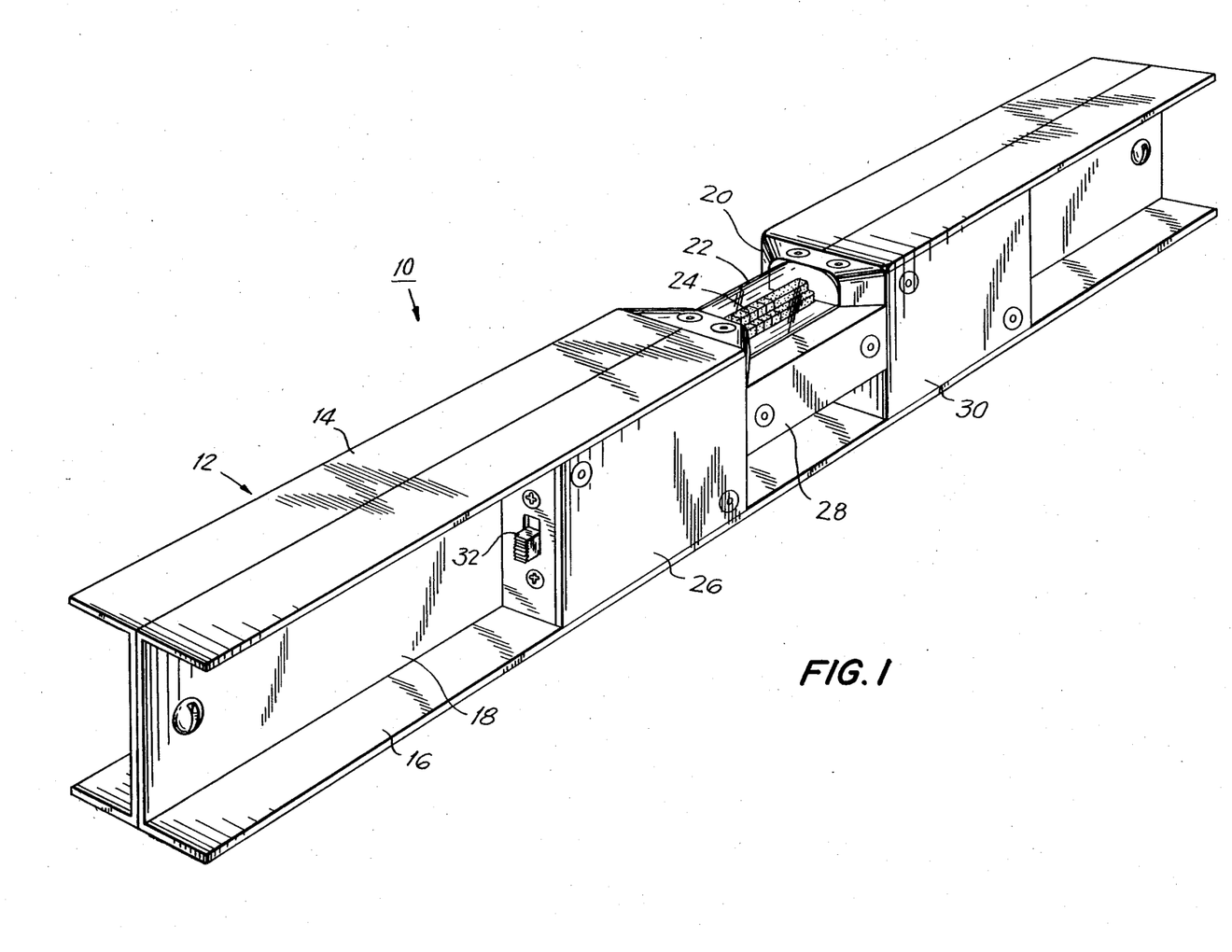
FIG. 1 is a perspective view of the electronic level in which the present invention finds ready application.

Referring now to the drawings, wherein like reference numerals are used throughout, FIG. 1 is a perspective view of one embodiment of a level in which the present invention finds ready application. Level 10 is formed as an I-beam 12 having a top flange 14 mechanically connected to a bottom flange 16 by means of a web 18. The manner in which I-beam 12 is fabricated forms no part of the present invention per se.

A gap 20 is provided in the central portion of top flange 14, this gap extending downward into at least a portion of web 18. Preferably, gap 20 is formed in the very center of the level. A display housing 22 containing visual indicators 24 is positioned within gap 20. Advantageously, the display housing is formed of a clear plastic shell to facilitate human observation of the display provided by visual indicators 24. The visual indicators are formed of a linear array of indicating elements, preferably light emitting diodes (LED's). Alternatively, the visual indicators may be formed as LCD's or other conventional display elements, such as fluorescent elements, electroluminescent elements, or the like. To simplify the present description, it is assumed that visual indicators 24 are formed of an array of LED's. Preferably, such LED's are comprised of elements of different colors, such as red, yellow and green. If, for example, the visual indicators are formed of nine LED's, they may be arranged as follows when viewed from left to right in FIG. 1: three red LED's, followed by a yellow LED, followed by a green LED, followed by a yellow LED, followed by three red LED's. As will be explained, when level 10 is properly aligned with respect to a reference plane (e.g. when level 10 is disposed in proper horizontal orientation), the green LED is energized to indicate such proper alignment. A small deviation from such proper alignment results in the energization of one or the other yellow LED, thus indicating not only the existence of a deviation but the direction thereof (e. g. whether level 10 is tilted upward or downward). A still greater deviation from proper alignment results in the energization of one of the red LED's, thus indicating not only the relative degree of deviation (by reason of the particular red LED which is energized) but also the direction of such deviation. Thus, the observation of the particular LED which is energized is analogous to the observation of the position of the conventional "bubble" normally provided in conventional levels.

Level 10 is provided with a plurality of individual housings, three of which are illustrated on one side of web 18 as housings 26, 28 and 30, and three of which are disposed on the opposite side of the web and, thus, are not viewed in FIG. 1. Preferably, the housings on both sides of web 18 are of substantially identical construction and configuration; and it will be appreciated that these housings are used to house the circuitry and power sources which are used to sense the orientation of level 10 and drive visual indicators 24. For example, housing 26 may be used to house a battery, such as a 3-volt lithium battery exhibiting a relatively long life time, and a current regulator. A display driver used to drive visual indicators 24 may be provided in housing 28. Yet another battery, such as a 9-volt battery used to supply suitable current to the visual indicators, may be provided in housing 30. Although not shown, a housing opposite housing 26 and disposed on the other (not viewable) side of web 18 may house a transducer which is used to measure the orientation of level 10 with respect to, for example, the horizontal. Another similar transducer used to measure the vertical orientation of the level may be provided in the housing opposite housing 30 and disposed on the non-viewable side of web 18. Finally, a bidirectional orientation switch may be provided in a housing opposite housing 28. The manner in which these electrical components are interconnected and cooperate with each other will be described further hereinbelow.

Preferably, an on/off switch 32 is provided in housing 26 and, as will be described, is used to provide electrical connections between the aforementioned batteries housed in housings 26 and 30 and the electrical circuitry included in various ones of the other housings. When opened, switch 32 prevents inadvertent current drain of the batteries when level 10 is not used but, nevertheless, is disposed in its operating orientation. For the purpose of the present discussion, it will be assumed that the "operating orientation" of the level is attained when the level is used to measure horizontal or vertical orientation of a surface. The "non-operating orientation" is exhibited when level 10 is disposed on its side, for example, when flanges 14 and 16 are substantially parallel to the vertical plane.

In use, switch 32 is disposed in its "on" condition to supply current to the transducers which are used to sense horizontal or vertical orientation of level 10. The bidirectional orientation switch included in the housing (it is appreciated that individual housings, as illustrated, may be used or, alternatively, a single housing may be provided for the electronic circuitry) senses when the level is closer to the horizontal or vertical and supplies current to the horizontal transducer or to the vertical transducer, accordingly. Depending upon the orientation of the level, as sensed by the appropriate transducer, a particular one of the LED's included in visual indicator 24 is energized. By observing this display, the user is apprised of the relative horizontal or vertical orientation of the level.

Figure 2:
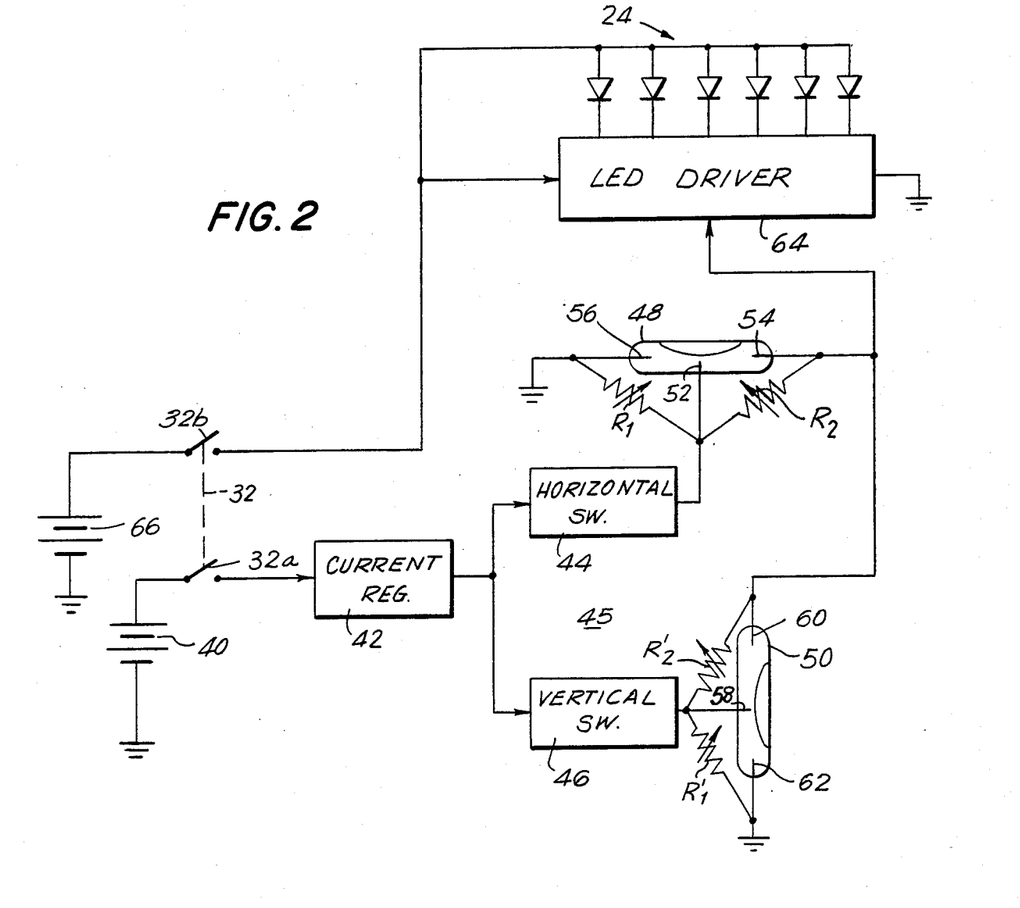
FIG. 2 is a partial schematic, partial block diagram of one embodiment of the electronic level of the present invention.

Referring now to FIG. 2, there is a partial block, partial schematic diagram of one embodiment of the electronic circuitry included in level 10. This circuitry is comprised of a current regulator 42, a bidirectional orientation switch 45, horizontal and vertical electrolytic transducers 48 and 50, a display driver 64 and visual indicators 24. Current regulator 42 may be of conventional construction, such as Model ECG857M, this current regulator being coupled by way of a contact 32a included in on/off switch 32 to a battery 40. In the example described herein, a separate battery, such as a 3-volt lithium battery, is used to supply current via current regulator 42 to the electrolytic transducers; and another battery 66, such as a conventional 9-volt battery, is used to supply energizing current to visual indicators 24. It is expected that the current drawn by the visual indicators is greater than the current drawn by the electrolytic transducers; and battery 66 may be replaced more often than battery 40. If desired, however, a single battery can be used to supply energizing current to the visual indicators as well as current to the electrolytic transducers.

Figures 4, 6:
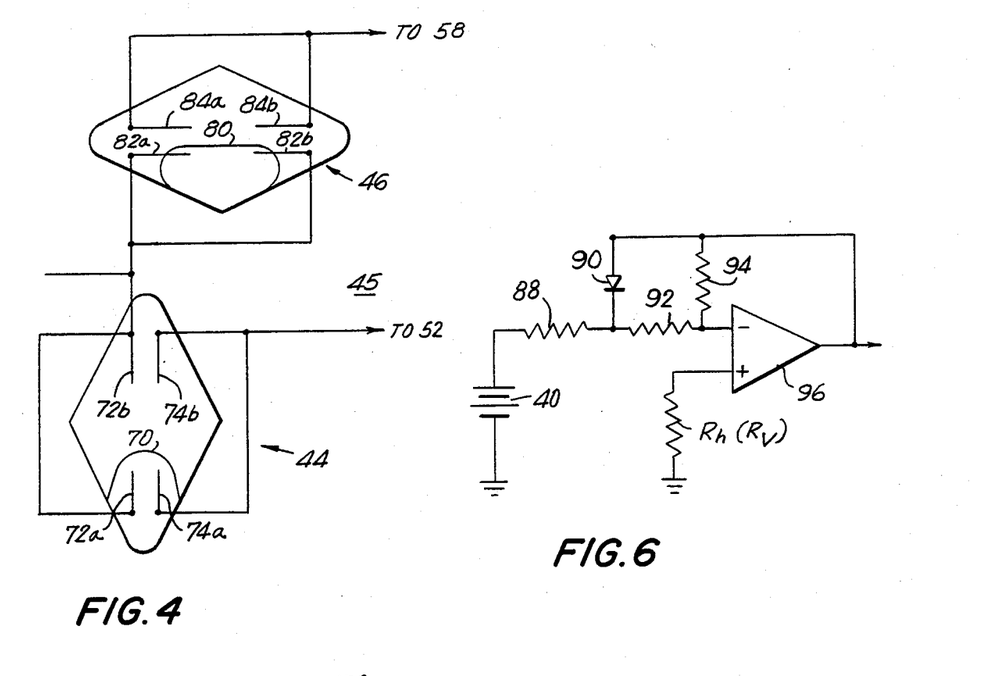
FIG. 4 is a schematic representation of the orientation switches that may be used with this invention.
FIG. 6 is a schematic representation of the circuitry incorporating the electrolytic transducers of the embodiment of FIG. 5.

The output of current regulator 42 is coupled via bidirectional orientation switch 45 to each of electrolytic transducers 48 and 50. Switch 45 is represented as separate switches designated horizontal switch 44 and vertical switch 46. Preferably, each switch may be constructed as a mercury switch that senses the horizontal or vertical position thereof so as to close its contacts. As an example, switches 44 and 46 may be of the type commercially available as Tilt Switches from Fifth Dimension, Inc. of Trenton, New Jersey. When switch 44 is disposed in an approximately horizontal configuration, as when level 10 is closer to the horizontal plane than to the vertical plane, the switch closes to supply current therethrough. At this time, vertical switch 46 opens. Conversely, when vertical switch 46 is disposed in an approximately vertical configuration, as when level 10 is closer to the vertical plane than to the horizontal plane, the vertical switch closes to supply current therethrough while horizontal switch 44 opens. One embodiment of bidirectional orientation switch 45 is schematically represented in FIG. 4, and is described below.

Electrolytic transducer 48 functions as a horizontal transducer and electrolytic transducer 50 functions as a vertical transducer. Transducer 48, which may be of the type manufactured by Fredericks Company of Huntingdon Valley, Pennsylvania, is comprised of a container partially filled with electrolytic fluid and including electrodes 52, 54 and 56. Similarly, transducer 50 is formed as a container partially filled with electrolytic liquid and includes electrodes 58, 60 and 62. With respect to transducer 48, electrode 52 is referred to as a first, or input, electrode; electrode 54 is referred to as a second, or output, electrode; and electrode 56 is referred to as a third, or common, electrode. Similar designations are applied to electrodes 58 (first, or input), 60 (second, or output) and 62 (third, or common) of transducer 50. It will be appreciated that a bubble is formed in the partially filled container included in transducer 48. The position of this bubble is determined by the relative horizontal orientation of the transducer. As this bubble moves to the left of the container, as when the transducer is tilted downward (in the clockwise) direction, more electrolytic fluid is disposed between input electrode 52 and output electrode 54. Conversely, when the bubble included in transducer 48 shifts to the right, as when the transducer is tilted in the upward (counterclockwise) direction, a greater quantity of electrolytic fluid is disposed between input electrode 52 and common electrode 56. Thus, as the position of the bubble included in the container varies, that is, as the quantity of electrolytic liquid between electrodes 52 and 54 and between electrodes 52 and 56 varies, the impedance between the respective electrodes likewise varies. FIG. 2 schematically represents these variable impedances as adjustable resistors $R_1$ and $R_2$.

It is recognized that transducers 48 and 50 are disposed orthogonally to each other. That is, when level 10 is in approximately horizontal orientation, the bubble included in transducer 48 is in the approximate center of the illustrated container. At this time, the bubble included in transducer 50 is located at the very top of the container in the vicinity of electrode 60. However, when level 10 is disposed in approximately vertical configuration, the bubble included in transducer 50 is located at the approximate center thereof and the bubble included in transducer 48 now is located at the top of the container in the vicinity of electrode 54. Hence, as the orientation of level 10 with respect to the vertical plane varies, the impedances between electrodes 58 and 60 and between electrodes 58 and 62 of transducer 50 vary in a corresponding manner. Such variable impedances are represented as variable resistors $R'_1$ and $R'_2$ in FIG. 2. As will be described below, in one embodiment the variable impedances formed between the respective electrodes of transducers 48 and 50 function as current divider circuits.

Input electrodes 52 and 58 of transducers 48 and 50 are coupled to current regulator 42 by way of horizontal and vertical switches 44 and 46, respectively. Common electrodes 56 and 62 are connected in common to a reference potential, such as ground; and output electrodes 54 and 60 are connected in common to display driver 64. The display driver comprises, in one embodiment an LED driver, such as Model ECG1508, manufactured by Phillips ECG, Inc A similar LED driver is manufactured by National Semiconductor Corp. The display driver is coupled to each of the individual indicator elements included in the array of visual indicators 24, such as each of the LED's included therein. Depending upon the magnitude of the current supplied to display driver 64, a corresponding one of the indicator elements is energized. As an alternative, the display driver may be of the type which is voltage-responsive so as to energize a respective one of the indicator elements as a function of the magnitude of a voltage supplied thereto. In that case, the signal supplied to display driver 64 by transducer 48 or by transducer 50 is a voltage whose magnitude is a function of the particular orientation of the respective transducer from which it is produced. It will be recognized that, if display driver 64 is of the voltage-sensitive type, each of transducers 48 and 50 may operate as a voltage divider circuit; and current regulator 42 may be replaced by a voltage regulator.

In anticipation of the higher current levels drawn by the LED's which may be included in visual indicators 24, a separate battery 64 may be utilized as a source of that energizing current. As illustrated in FIG. 2, battery 66 is coupled to all of the LED's in common by way of switch contact 32b. Contacts 32a and 32b are ganged for simultaneous operation and, together, these contacts comprise on/off switch 32.

In the embodiment wherein display driver 64 is formed as Model ECG1508, energizing potential for this display driver is supplied thereto from battery 66. As a numerical example, battery 66 may comprise a 9-volt battery. Of course, other suitable voltages may be utilized to carry out the present invention.

Figure 3:
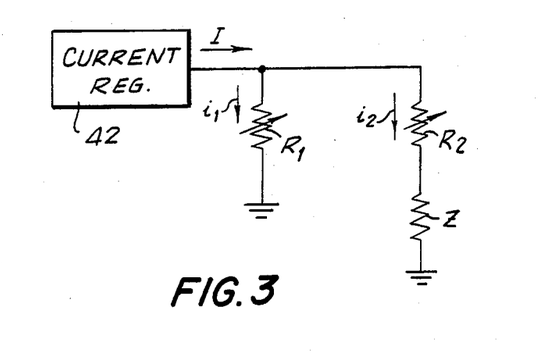
FIG. 3 is a schematic representation of the electrolytic transducers that are used in the embodiment of FIG. 2 and which is useful in understanding the operation thereof.

Before describing the manner in which the electronic circuitry illustrated in FIG. 2 operates, reference is made to FIG. 3. Here, a schematic representation of the current divider circuit which is formed within transducer 48 (or transducer 50) is represented. As mentioned above, the impedance between input electrode 52 and common electrode 56 is variable and is represented as variable resistor $R_1$. The actual value of this impedance $R_1$ is a function of the quantity of electrolytic liquid disposed between electrodes 52 and 56. Stated otherwise, the value of impedance $R_1$ is a function of the position of the bubble included in transducer 48, and this position is a function of the orientation of level 10 with respect to the horizontal plane. Likewise, the impedance between input electrode 52 and output electrode 54 is variable, and is represented as adjustable resistor $R_2$ whose value is a function of the position of the bubble within the transducer. It is further assumed that the output impedance between output electrode 54 and, for example, ground, that is, the impedance through display driver 64 to ground and through transducer 50 to ground is represented as a substantially constant impedance Z. It will be seen that, when measuring and indicating the relative horizontal orientation of level 10, a constant impedance Z may be assumed without significant error. Thus, the current I (which is assumed to be constant) supplied by current regulator 42 via horizontal switch 44 to transducer 48 is seen to flow to a current divider circuit in which variable resistance $R_2$ is connected in series with constant impedance Z, and this series circuit is connected in parallel with variable resistor $R_1$.

From the schematic representation shown in FIG. 3, it will be recognized that the output current $i_2$ from output electrode 54 of transducer 48 may be represented as follows:

$$i_2 = \frac{R_1}{R_1 + R_2 + Z} I$$

Since the current I supplied by current regulator 42 is assumed to be constant, it is seen that the output current $i_2$ produced by transducer 48 varies as a function of the resistances $R_1$ and $R_2$ between input electrode 52 and each of output electrode 54 and common electrode 56. Such resistances are determined by the relative position of the bubble within the container of transducer 48 and, thus, such resistances are seen to vary as a function of the orientation of the transducer and, thus, the orientation of level 10, with respect to the horizontal plane.

It will be understood that the output signal produced by transducer 50 varies in a similar manner as the resistances $R'_1$ and $R'_2$ between input electrode 58 and each of output electrode 60 and common electrode 62 vary. As was the case for transducer 48, the position of the bubble within the container of transducer 50 is determined by the relative orientation of this transducer. When level 10 is used to measure vertical orientation, the position of the bubble within the container of transducer 50 is determined by the deviation of the level from such vertical orientation.

Before returning to the discussion of the circuitry illustrated in FIG. 2, reference now is made to the schematic representation of bidirectional orientation switch 45 shown in FIG. 4. This switch is formed of two separate switches, designated previously as horizontal switch 44 and vertical switch 46. These two switches are of substantially similar construction, including a capsule containing a mercury globule 70 (or 80) and switch contacts 72a, 74a and 72b, 74b (or 82a, 84a and 82b, 84b). The mercury globule is seen to slide within its capsule and, depending upon the orientation of the capsule, the mercury globule either completes or interrupts a circuit connection between switch contacts 72a and 74a, or 72b and 74b (or between switch contacts 82a and 84a, or 82b and 84b). More particularly, when level 10 is used for measuring horizontal orientation, that is, when the deviation of the level from the horizontal plane is less than its deviation from the vertical plane, mercury globule 70 provides a circuit connection between switch contacts 72a and 74a, as shown, but mercury globule 80 opens the circuit between switch contacts 82a and 84a or between contacts 82b and 84b. If the level is oriented upside down, mercury globule 70 provides a circuit connection between switch contacts 72b and 74b. Conversely, when level 10 is used for measuring vertical orientation, that is, when the deviation of the level from the vertical plane is less than its deviation from the horizontal plane, mercury globule 70 slides to one end of its capsule to open the circuit connection between switch contacts 72a and 74a, and between contacts 72b and 74b, but mercury globule 80 now completes the circuit connection between, for example, switch contacts 82a and 84a. Here too, if the level now is oriented upside down, mercury globule 80 provides a circuit connection between switch contacts 82b and 84b. Thus, when the level is used to measure horizontal orientation, the current supply from current regulator 42 passes through horizontal switch 44 to transducer 48. Conversely, when the level is used to measure vertical orientation, the current supplied from the current regulator passes through vertical switch 46 to transducer 50. It is recognized that the horizontal and vertical switches operate in a mutually exclusive manner such that current is supplied only to one or the other of the transducers.

Returning now to FIG. 2, let it be assumed that on/off switch 32 is closed. Consequently, switch contact 32a supplies current from battery 40 to current regulator 42. Concurrently therewith, switch contact 32b supplies current from battery 66 to visual indicators 24 and also to display driver 64. If level 10 is used to measure horizontal orientation, horizontal switch 44 is closed, as described above in conjunction with FIG. 4, to supply current to input electrode 52 of transducer 48. As was described previously with respect to FIG. 3, depending upon the orientation of the transducer, the bubble in the electrolytic liquid therein is positioned so as to establish the resistances $R_1$ and $R_2$ between input electrode 52 and each of electrodes 54 and 56. Depending upon the value of resistance $R_2$ between input electrode 52 and output electrode 54, output current $i_2$ exhibits a corresponding magnitude. This current is supplied to display driver 64 which, in turn, energizes a corresponding one of the indicator elements (e.g. a corresponding one of the LED's) as a function of the magnitude of this output current $i_2$. As the position of the bubble within transducer 48 changes, the magnitude of the output current $i_2$ likewise changes and, consequently, the particular indicator element which is energized by display driver 64 also may change. Thus, the particular indicator element that is energized provides an accurate representation of the degree and direction of deviation of level 10 from, in this example, the horizontal plane.

As an example, display driver 64 may respond to a maximum magnitude in the output current supplied thereto to energize the left-most indicator element; and, as this current magnitude gradually decreases, the display driver energizes the next adjacent indicator element until, at minimum current magnitude, the right-most indicator element is energized. It will be appreciated, in accordance with this example, that when the output current supplied to display driver 64 exhibits a magnitude at the approximate midpoint of its range, the centrally positioned indicator element included in array 24 is energized. It will be seen that the shifting of the energized indicator elements is analogous to the conventional shifting of the bubble heretofore used in conventional levels.

The foregoing description has assumed the use of level 10 to measure horizontal orientation. If the level is disposed in a configuration so as to measure vertical orientation, horizontal switch 44 opens and vertical switch 46 closes, as was described above in conjunction with FIG. 4. As a result, current now is supplied from battery 40 via current regulator 42 and vertical switch 46 to transducer 50. This transducer operates in the manner described above with respect to the operation of transducer 48, and in accordance with the description set out in conjunction with FIG. 3, to supply an output current to display driver 64 having a magnitude determined by the vertical orientation of the level. Thus, when used to measure vertical orientation, a particular indicator element is energized as a function of the deviation of the level from the vertical plane. The energization of the indicator element positioned at the midpoint of array 44 indicates proper vertical alignment of level 10.

From the foregoing discussion of FIG. 4, it is recognized that, in the embodiment described herein, the switch contacts of horizontal switch 44, including mercury globule 70, are orthogonally positioned with respect to the switch contacts (including mercury globule 80) of vertical switch 46. Thus, only one or the other of these switches will be closed, depending upon the orientation of level 10 and, thus, the orientation of the capsules in which the mercury globules are contained. Advantageously, when level 10 is disposed in its non-operating orientation, for example, when flanges 14 and 16 extend in the generally vertical direction, mercury globules 70 and 80 in switches 44 and 46 both are positioned in their respective capsules so as to interrupt the electrical connections between switch contacts 72a, 74a and 72b, 74b; and between switch contacts 82a, 84a and 82b, 84b. That is, both switches are seen to be opened when the level is disposed in its non-operating orientation. As a result, current is not supplied through either transducer and, consequently, an output current is not supplied from either transducer to display driver 64. Therefore, even if on/off switch 32 remains closed when the level is disposed in its non-operating orientation, none of the indicator elements included in array 24 is energized (because current is not supplied to the display driver from the transducers) and, hence, no significant current is drawn by visual indicators 24 from battery 66.

Figure 5:
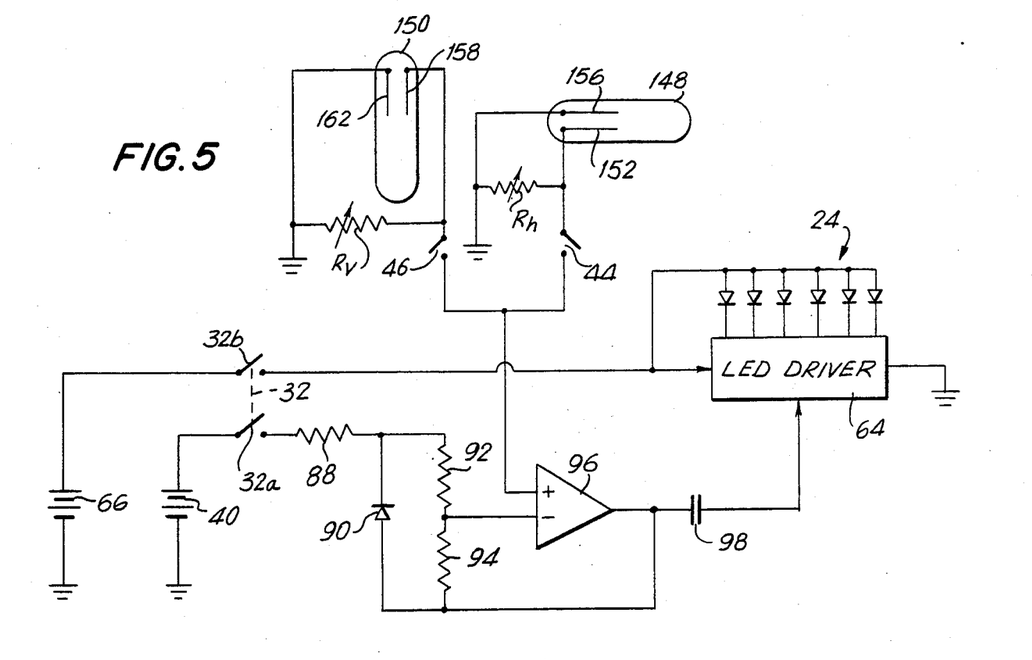
FIG. 5 is a schematic diagram of another embodiment of the electronic level of this invention.

Another embodiment of the present invention is illustrated in FIG. 5. This embodiment differs from that described hereinabove with respect to FIG. 2 in that the electrolytic transducers of FIG. 5 are connected to an input of a regulator circuit rather than an output thereof. In the FIG. 5 embodiment, the regulator circuit produces an output signal in response to the energization thereof by battery 40, this output signal having a magnitude which varies as a function of the impedance connected to an input of the regulator circuit. As this impedance changes, the magnitude of the output signal likewise changes. Since this impedance is a function of the orientation of the electrolytic transducers, it is recognized that the magnitude of the output signal produced by the regulator circuit varies as a function of such orientation. Display driver 64 is supplied with that output signal to drive LED's 24 as a function of the magnitude thereof.

The regulator circuit provided in the FIG. 5 embodiment includes an operational amplifier 96 having inverting and non-inverting inputs as well as an output. The inverting input of operational amplifier 96 is coupled to battery 40 via switch contact 32a of on/off switch 32 and resistors 88 and 92 connected in series between the switch contact and the inverting input. A feedback resistor 94 is provided between the output and inverting input of the operational amplifier. Additionally, a diode 90 is connected such that the cathode thereof is coupled to the junction defined by resistors 88 and 92 and the anode thereof is coupled to the output of the operational amplifier.

The non-inverting input of operational amplifier 96 is coupled to electrolytic transducer 148 via horizontal switch 44, and also to electrolytic transducer 150 via vertical switch 46. As in the embodiment described above in conjunction with FIGS. 2 and 4, only one or the other of switches 44 and 46 may be closed at any given time and, thus, the non-inverting input of operational amplifier 96 is seen to be connected either to transducer 148, referred to as the horizontal transducer, or to transducer 150, referred to as the vertical transducer.

Horizontal transducer 148 is formed as a container partially filled with electrolytic liquid and including electrodes 152 and 156. Similarly, vertical transducer 150 is formed as a container partially filled with electrolytic liquid and including electrodes 158 and 162. It will be appreciated that a bubble is formed in the partially filled container included in each of transducers 148 and 150. The position of this bubble is determined by the relative horizontal or vertical orientation of the respective transducer. As this bubble moves toward one or the other end of the container, the quantity of electrolytic fluid disposed between the electrodes varies. This, in turn, varies the impedance between the electrodes. The impedance between electrodes 152 and 156 of horizontal transducer 148 is represented in FIG. 5 as a variable resistor $R_h$, schematically illustrated therein; and, likewise, the impedance between electrodes 158 and 162 of vertical transducer 150 is represented as the variable resistor $R_v$. Electrode 152 is connected by horizontal switch 44 to the non-inverting input of operational amplifier 96, and electrode 156 is connected to a reference potential, such as ground. Similarly, electrode 158 of vertical transducer 150 is connected by vertical switch 46 to the non-inverting input of the operational amplifier, and electrode 162 is connected to ground.

When level 10 is in approximately horizontal orientation, horizontal switch 44 is closed, as mentioned above in conjunction with FIG. 4, thus connecting horizontal transducer 148 to the non-inverting input of operational amplifier 96. Depending upon the precise orientation of the level, the bubble included in transducer 148 determines the impedance ($R_h$) between the non-inverting input and ground. As a result, the output signal generated by the regulating circuit, that is, the output signal provided by operational amplifier 96, exhibits a magnitude that is dependent upon the value of impedance $R_h$. As the orientation of the level changes, this value $R_h$ likewise changes, resulting in a corresponding change in the output signal. This output signal is coupled by capacitor 98 to display driver 64. The capacitor is selected such that it exhibits a resistance in parallel with the capacitance thereof, and as a consequence, a DC output signal generated by operational amplifier 96 is supplied to the display driver. The particular LED which is energized by the display driver is, of course, determined by the magnitude of this output.

Conversely, when level 10 is disposed in approximately vertical configuration, vertical switch 46 closes to connect vertical transducer 150 to the non-inverting input of operational amplifier 96. Depending upon the particular position of the bubble within the container of this transducer, the impedance ($R_v$) between the non-inverting input and ground is established accordingly. Here too, the magnitude of the output signal produced by the operational amplifier is a function of the value of this impedance $R_v$. As the precise vertical configuration of the level changes, this impedance $R_v$ likewise changes, resulting in a corresponding change in the magnitude of the output signal. The particular LED which is energized by display driver 64 is determined by this output signal magnitude.

In the event that level 10 is disposed on its side, i.e., in the event that the level is positioned in a non-operating configuration, horizontal and vertical switches 44 and 46 both are opened, resulting in a high impedance open circuit connected to the non-inverting input of operational amplifier 96. Consequently, very little current is drawn from battery 40, whereupon battery drain is minimized.

An equivalent schematic representation of the regulating circuit connected to one or the other of transducers 148 and 150 is illustrated in FIG. 6. Depending upon which of horizontal and vertical switches 44 and 46 is closed, either the horizontal transducer 148, exhibiting an effective impedance $R_h$, or vertical transducer 150, exhibiting an effective impedance $R_v$, is connected to the non-inverting input of operational amplifier 96. Simple analysis of the circuit shown in FIG. 6 by one of ordinary skill in the art provides a mathematical relationship between the output signal generated thereby and the input voltage supplied by battery 40, this relationship depending, at least in part, upon the value of impedance $R_h$ (or $R_v$). Thus, the output signal generated by the circuit illustrated in FIG. 6 varies as a function of the impedance $R_h$ (or $R_v$) which, in turn, is determined by the orientation of transducer 148 (or transducer 150). Thus, as the orientation of level 10 changes, the magnitude of the output signal supplied to display driver 64 by operational amplifier 96 likewise varies. The particular LED indicator element that is energized by display driver 64 thus provides an accurate representation of the degree and direction of level 10 from either the horizontal plane or the vertical plane.

While the present invention has been particularly shown and described with reference to a preferred embodiment, various changes and modifications may be made without departing from the spirit and scope of the invention. Some of these changes have been mentioned above and others will be apparent to those of ordinary skill. For example, transducers 48 and 50 in FIG. 2 have been described as current divider circuits. It is appreciated that, in view of the fact that the effective impedance of each transducer changes as a function of its orientation, the transducer may operate as a voltage divider circuit. In that event, current regulator 42 may be replaced by a voltage regulator; and the output signal supplied to display driver 64 from transducers 48 and 50 will be a voltage whose magnitude varies as a function of the orientation of level 10.

As yet another alternative, orientation switch 45 may be implemented by other gravity-sensitive switches or orientation-sensitive switches which function to supply current (or voltage) to one or the other transducer depending upon the particular orientation of the level. Although not preferred, individual, manually operable switches may be used as horizontal and vertical switches 44 and 46.

It is intended that the appended claims be interpreted so as to include the foregoing as well as various other changes and modifications.

What is claimed is:

1. An electronic level comprising: housing means; a battery within said housing means; an electrolytic transducer within said housing means, the electrolytic transducer including a container partially filled with electrolyte and exhibiting an effective impedance that varies with a change in the orientation thereof relative to a reference plane; drive signal generating means energized by said battery to generate an output signal; means for connecting said electrolytic transducer to said drive signal generating means for varying said output signal as a function of the effective impedance of said transducer; an array of visual display indicators selectively driven to provide a visual indication of a deviation of said housing means with respect to a reference orientation; and display driver means coupled to receive said output signal for driving said visual display indicators as a function of the magnitude of said output signal.

2. The level of claim 1 wherein said electrolytic transducer includes an input electrode to receive an electrical current derived from said battery, an output electrode coupled to said display driver means, and a common terminal, the impedance between said input electrode and each of said output and common electrodes varying with the quantity of electrolyte therebetween and the quantity of electrolyte between said input electrode and each of said output and common electrodes varying with the orientation of said electrolytic transducer relative to said reference plane.

3. The level of claim 2 wherein the impedance between said input electrode and said output electrode and the impedance between said input electrode and said common electrode comprise a current divider circuit; and said output signal supplied to said display driver means comprises an output current whose magnitude is determined by the dividing ratio of said current divider circuit, whereby the dividing ratio changes as said impedances change.

4. The level of claim 1 wherein said reference orientation is horizontal.

5. The level of claim 1 wherein said reference orientation is vertical.

6. The level of claim 1 wherein said drive signal generating means comprises regulating means for generating a regulated current; and said electrolytic transducer is supplied with said regulated current and varies the magnitude thereof in accordance with said effective impedance to supply a current to said display driver means that varies with changes in the orientation of said transducer.

7. The level of claim 1 wherein said drive signal generating means comprises regulating means coupled to said battery for generating an output signal in response to battery voltage, said regulating means having a terminal adapted to be coupled to an impedance, the magnitude of said output signal being a function of the impedance coupled to said terminal, and said electrolytic transducer is coupled to said terminal to vary said last-mentioned impedance as a function of the orientation of said transducer.

8. The level of claim 7 wherein said regulating means comprises operational amplifier means having inverting and non-inverting inputs and an output, one of said inputs being coupled to said battery, the other of said inputs being coupled to said electrolytic transducer, and said output being coupled to said display driver means.

9. The level of claim 8, further comprising a voltage regulating circuit, including a diode, for coupling said one input of said operational amplifier means to said battery and for providing a feedback path from said output to said one input; and said electrolytic transducer is connected between said other input and a reference potential.

10. An electronic level comprising: housing means; a battery within said housing means; horizontal and vertical transducers within the housing means, said horizontal transducer exhibiting an effective impedance which varies with a change in the orientation thereof relative to horizontal and said vertical transducer exhibiting an effective impedance which varies with a change in the orientation thereof relative to vertical; signal generating means energized by said battery for generating an output signal; means for connecting the horizontal and vertical transducers to said signal generating means to vary said output signal as a function of the effective impedance thereof; an array of visual indicators selectively driven to provide visual indications of a deviation of said housing means with respect to a horizontal plane or with respect to a vertical plane; and driver means within said housing means, said driver means being coupled to receive said output signal as varied by one or the other transducer, said output signal having a magnitude determined by the effective impedance of that transducer, said driver means driving said visual indicators as a function of the magnitude of said output signal.

11. The level of claim 10 wherein said means for connecting the horizontal and vertical transducers to said signal generating means comprise horizontal and vertical switch means, the horizontal switch means being actuated when the deviation of said housing means from the horizontal plane is less than the deviation of said housing means from the vertical plane, and the vertical switch means being actuated when the deviation of said housing means from the vertical plane is less than the deviation of said housing means from the horizontal plane.

12. The level of claim 11 wherein each of said horizontal and vertical switch means is constructed as a bidirectional mercury switch included in said housing means for providing an electrical connection therethrough to said horizontal or vertical transducer, respectively, depending upon the deviation of said housing means from the horizontal and vertical planes.

13. The level of claim 10 wherein said means for connecting the horizontal and vertical transducers to said signal generating means comprise horizontal and vertical mercury switches within said housing means, each switch being coupled to a respective transducer and having two sets of switch contacts oppositely positioned with respect to each other, each set in a switch providing an electrical connection therethrough to the same transducer depending upon the orientation of said housing means with respect to the horizontal and vertical planes and irrespective of whether said housing means is oriented upside down, said switch contacts being deactivated to interrupt the supply of electrical current to both transducers when said housing is disposed in a non-operating orientation.

14. The level of claim 13 wherein one or the other of said sets of switch contacts in said horizontal mercury switch is closed when said housing means is disposed in approximately horizontal orientation, and one or the other of said sets of switch contacts in said vertical mercury switch is closed when said housing means is disposed in approximately vertical orientation, and both sets of switch contacts in both of said switches are opened when said housing means is disposed in said non-operating orientation.

15. The level of claim 10 wherein each transducer comprises a container partially filled with electrolytic liquid and including first, second and third electrodes, the respective impedances between said first and second electrodes and between said first and third electrodes being determined by the relative level of said electrolytic liquid, said first electrode being coupled to said signal generating means for receiving the output signal generated thereby, said second electrode being coupled to said driver means and said third electrode being coupled to a reference potential, whereby the output signal supplied to said first electrode is varied by said respective impedances and the varied output signal is supplied by said second electrode to said driver means.

16. The level of claim 15 wherein said signal generating means comprises a current regulator for supplying a substantially constant current to said transducers notwithstanding fluctuations in battery voltage; and a manually operable power on/off switch for connecting said current regulator to said battery.

17. The level of claim 10 wherein each transducer comprises a container partially filled with electrolytic liquid and including a pair of electrodes, the impedance between said pair of electrodes being determined by the relative level of said electrolytic liquid, means for selectively connecting said pair of electrodes of one of said transducers in series between a reference potential and said signal generating means; and said signal generating means having an output coupled to said driver means, whereby the output signal is supplied to said driver means from said signal generating means and is varied as a function of the impedance between said pair of electrodes of the transducer connected thereto.

18. The level of claim 17 wherein said signal generating means comprises a regulator having a first input connected to said battery, a second input connected to one or the other of said transducers, and an output connected to said driver means.

19. The level of claim 18 wherein said regulator includes an operational amplifier having a non-inverting input, an inverting input and an output, an input circuit interconnected between said inverting input and said battery and a feedback circuit interconnected between said output and said inverting input; and further including horizontal and vertical switch means connected to said non-inverting input and selectively operated to couple said horizontal transducer or said vertical transducer thereto.

20. The level of claim 10 wherein said visual indicators comprise LED's, one of which is energized by said driver means; and further including another battery for supplying current to the energized LED.

21. An electronic level comprising: a power supply; horizontal and vertical transducers exhibiting impedance values that vary with changes in the orientations thereof relative to horizontal and vertical, respectively; means for supplying current from said power supply to one or the other of said horizontal and vertical transducers; an array of visual indicators for providing visual indications of the orientation of said horizontal or vertical transducer relative to said horizontal or vertical, respectively; and driver means coupled to said horizontal and vertical transducers for receiving an output signal from one or the other having a magnitude determined by the impedance value of that transducer and for driving said visual indicators to energize a selected one as a function of said output signal.

22. The level of claim 21 wherein said means for supplying current to one or the other of said transducers comprises orientation switch means having one set of contacts which close to supply current therethrough to said horizontal transducer when said orientation switch means is oriented closer to a horizontal plane than to a vertical plane, said orientation switch means having another set of contacts which close to supply current therethrough to said vertical transducer when said orientation switch means is oriented closer to said vertical plane than to said horizontal plane.

23. The level of claim 22 wherein said orientation switch means comprise horizontal and vertical switches, respectively, each being closed mutually exclusively of the other.

24. The level of claim 21 wherein each transducer comprises a container partially filled with electrolytic fluid to form a bubble therein, and including first, second and third electrodes, the impedance value between said first electrode and each of said second and third electrodes being a function of the position of said bubble in said container, said first electrode being coupled to said means for supplying current, said second electrode being coupled to said driver means, and said third electrode being coupled to a reference potential.

25. The level of drain 24 wherein the impedance values between the respective electrodes of a transducer form a divider circuit.

26. The level of claim 25 wherein said divider circuit is a current divider for dividing between said impedance values the current that is supplied to said first electrode, whereby the magnitude of said current flowing through the impedance value between said first and second electrodes changes as the impedance values change.

27. The level of claim 21 wherein said visual indicators display different colors of light as an indication of the relative orientation of said level with respect to said horizontal or vertical.

28. The level of claim 21 wherein said visual indicators comprise a single array of LED's for indicating the relative orientation of said level with respect to said horizontal or the relative orientation of said level with respect to said vertical.

29. The level of claim 28 wherein a single LED in said array is energized by said driver means to indicate the relative amount and direction of deviation of said level from said horizontal or vertical.

30. An electronic level comprising: a source of energizing power; circuit means coupled to said source for providing an output signal in response to said energizing power; horizontal and vertical transducers exhibiting impedance values that vary with changes in the orientations thereof relative to horizontal and vertical, respectively; means for connecting one or the other of said horizontal and vertical transducers to said circuit means; an array of visual indicators for providing visual indications of the orientation of said horizontal or vertical transducer relative to said horizontal or vertical, respectively; and driver means coupled to said circuit means for receiving said output signal having a magnitude determined by the impedance value of the transducer connected to said circuit means and for driving said visual indicators to energize a selected one as a function of said output signal.

31. The level of claim 30 wherein said means for connecting one or the other of said transducers to said circuit means comprises orientation switch means having one set of contacts which close to connect said horizontal transducer to said circuit means when said orientation switch means is oriented closer to a horizontal plane than to a vertical plane, said orientation switch means having another set of contacts which close to connect said vertical transducer to said circuit means when said orientation switch means is oriented closer to said vertical plane than to said horizontal plane.

32. The level of claim 31 wherein said orientation switch means comprise horizontal and vertical switches, respectively, each being closed mutually exclusively of the other.

33. The level of claim 30 wherein each transducer comprises a container partially filled with electrolytic fluid to form a bubble therein, and including first and second electrodes, the impedance value between said first and second electrodes being a function of the position of said bubble in said container, said first electrode being coupled to said means for connecting, and said second electrode being coupled to a reference potential.

34. The level of claim 30 wherein said visual indicators display different colors of light as an indication of the relative orientation of said level with respect to said horizontal or vertical.

35. The level of claim 30 wherein said visual indicators comprise a single array of LED's for indicating the relative orientation of said level with respect to said horizontal or the relative orientation of said level with respect to said vertical.

36. The level of claim 35 wherein a single LED in said array is energized by said driver means to indicate the relative amount and direction of deviation of said level from said horizontal or vertical.

* * * * *